United States Patent [19]

Kurnit

[11] 4,222,011
[45] Sep. 9, 1980

[54] STOKES INJECTED RAMAN CAPILLARY WAVEGUIDE AMPLIFIER

[75] Inventor: Norman A. Kurnit, Santa Fe, N. Mex.

[73] Assignee: The United States of America as represented by the United States Department of Energy, Washington, D.C.

[21] Appl. No.: 948,267

[22] Filed: Oct. 3, 1978

[51] Int. Cl.$^2$ ............................................. H03F 7/05
[52] U.S. Cl. .................................... 330/4.5; 307/426; 330/4.6
[58] Field of Search ................ 307/88.3, 426; 330/4.5, 330/4.6

[56] References Cited

PUBLICATIONS

Byer et al., "Optics Letters," vol. 3, No. 4, Oct., 1978, pp. 144–145.
Rabinowitz et al., "Optics Letters," vol. 3, No. 4, Oct., 1978, pp. 167–168.
Rabinowitz et al., "Applied Optics," pp. 2005–2006, Sep., 1976.
Lallemand et al., "Applied Physics Letters," May 15, 1965, pp. 212–213.
Akanaev et al., "Soviet Physics JETP Letters," 1,104 (1965).

*Primary Examiner*—Rudolph V. Rolinec
*Assistant Examiner*—Darwin R. Hostetter
*Attorney, Agent, or Firm*—R. V. Lupo; William W. Cochran, II; Paul D. Gaetjens

[57] ABSTRACT

A device for producing stimulated Raman scattering of $CO_2$ laser radiation by rotational states in a diatomic molecular gas utilizing a Stokes injection signal. The system utilizes a cryogenically cooled waveguide for extending focal interaction length. The waveguide, in conjunction with the Stokes injection signal, reduces required power density of the $CO_2$ radiation below the breakdown threshold for the diatomic molecular gas. A Fresnel rhomb is employed to circularly polarize the Stokes injection signal and $CO_2$ laser radiation in opposite circular directions. The device can be employed either as a regenerative oscillator utilizing optical cavity mirrors or as a single pass amplifier. Additionally, a plurality of Raman gain cells can be staged to increase output power magnitude. Also, in the regenerative oscillator embodiment, the Raman gain cell cavity length and $CO_2$ cavity length can be matched to provide synchronism between mode locked $CO_2$ pulses and pulses produced within the Raman gain cell.

107 Claims, 3 Drawing Figures

STOKES INJECTED RAMAN CAPILLARY WAVEGUIDE AMPLIFIER

BACKGROUND OF THE INVENTION

The present invention pertains generally to infrared oscillators and amplifiers and more particularly to stimulated Raman scattering utilizing rotational transitions in a diatomic molecular gas.

Various methods have been disclosed for shifting frequencies of conventional lasers in the IR spectrum. These methods have included four-wave mixing as disclosed in application Ser. No. 787,415 filed Apr. 14, 1977 by Richard F. Begley et al. entitled "Resonantly Enhanced Four-Wave Mixing" now U.S. Pat. No. 4,095,121 and Raman scattering, as disclosed in application Ser. No. 466,583 filed May 2, 1974 by C. D. Cantrell et al. entitled "Infrared Laser System now U.S. Pat. No. 4,061,921. In each of these systems and other previous systems for IR frequency shifting to a broad range of frequencies, simplicity and overall efficiency are important factors for economic utilization of the device. By minimizing the steps required for frequency shifting, such as elimination of the Raman spin-flip laser, as set forth in the above disclosed application Ser. No. 466,583, the device can be simplified to reduce problems inherent in more complex systems.

Since the stimulated Raman effect can be produced in a single step with high conversion efficiency, Raman shifting of $CO_2$ laser radiation provides high overall efficiencies due to the high efficiencies and well developed technology of $CO_2$ lasers. However, Raman gain in gaseous media such as $H_2$, $D_2$, HD, HT, DT or $T_2$ requires powers which are near the breakdown threshold of these diatomic molecular gases for a single pass focused geometry, such as suggested by Robert L. Byer, in an article entitled "A 16 $\mu$m Source for Laser Isotope Enrichment" published in IEEE Journal of Quantum Electronics, Vol. QE12, pp. 732-733, November 1976.

Other devices have also used rotational Raman gain to generate Stokes signals such as disclosed in copending application Ser. No. 802,400 entitled "Shifting of $CO_2$ Laser Radiation Using Rotational Raman Resonances" filed June 1, 1977 by Norman A. Kurnit, of which the present invention comprises an improvement. The device of the above disclosed invention relies upon spontaneous generation of the desired Stokes signal. Such a system, of course, requires high power densities and long focal interaction lengths to ensure spontaneous generation of the desired Stokes signal.

SUMMARY OF THE INVENTION

The present invention overcomes the disadvantages and limitations of the prior art by providing a Stokes injected Raman waveguide amplifier. The device of the present invention uses an external Stokes signal injected in a capillary waveguide amplifier which Raman scatters $CO_2$ laser radiation by rotational states of a diatomic molecule such as $H_2$, $D_2$, HD, HT, DT or $T_2$. The Stokes injection signal reduces the required field strength of the $CO_2$ laser radiation and eliminates the necessity for spontaneous generation of Stokes radiation within the capillary amplifier.

It is therefore an object of the present invention to provide a Stokes injected Raman capillary waveguide amplifier.

It is also an object of the present invention to provide a Stokes injected Raman capillary waveguide regenerative amplifier.

Another object of the present invention is to provide a Stokes injected Raman capillary waveguide amplifier having high output powers.

Another object of the present invention is to provide a Stokes injected Raman capillary waveguide regenerative amplifier having high output powers.

Other objects and further scope of applicability of the present invention will become apparent from the detailed description given hereinafter. The detailed description, indicating the preferred embodiments of the invention, is given only by way of illustration since various changes and modifications within the spirit and scope of the invention will become apparent to those skilled in the art from this detailed description. The Abstract of the Disclosure is for the purpose of providing a nonlegal brief statement to serve as a searching and scanning tool for scientists, engineers and researchers and is not intended to limit the scope of the invention as disclosed herein nor is it intended to be used in interpreting or in any way limiting the scope or fair meaning of the appended claims.

DETAILED DESCRIPTION OF THE PREFERRED EMBODIMENT OF THE PRESENT INVENTION

Figure 1:
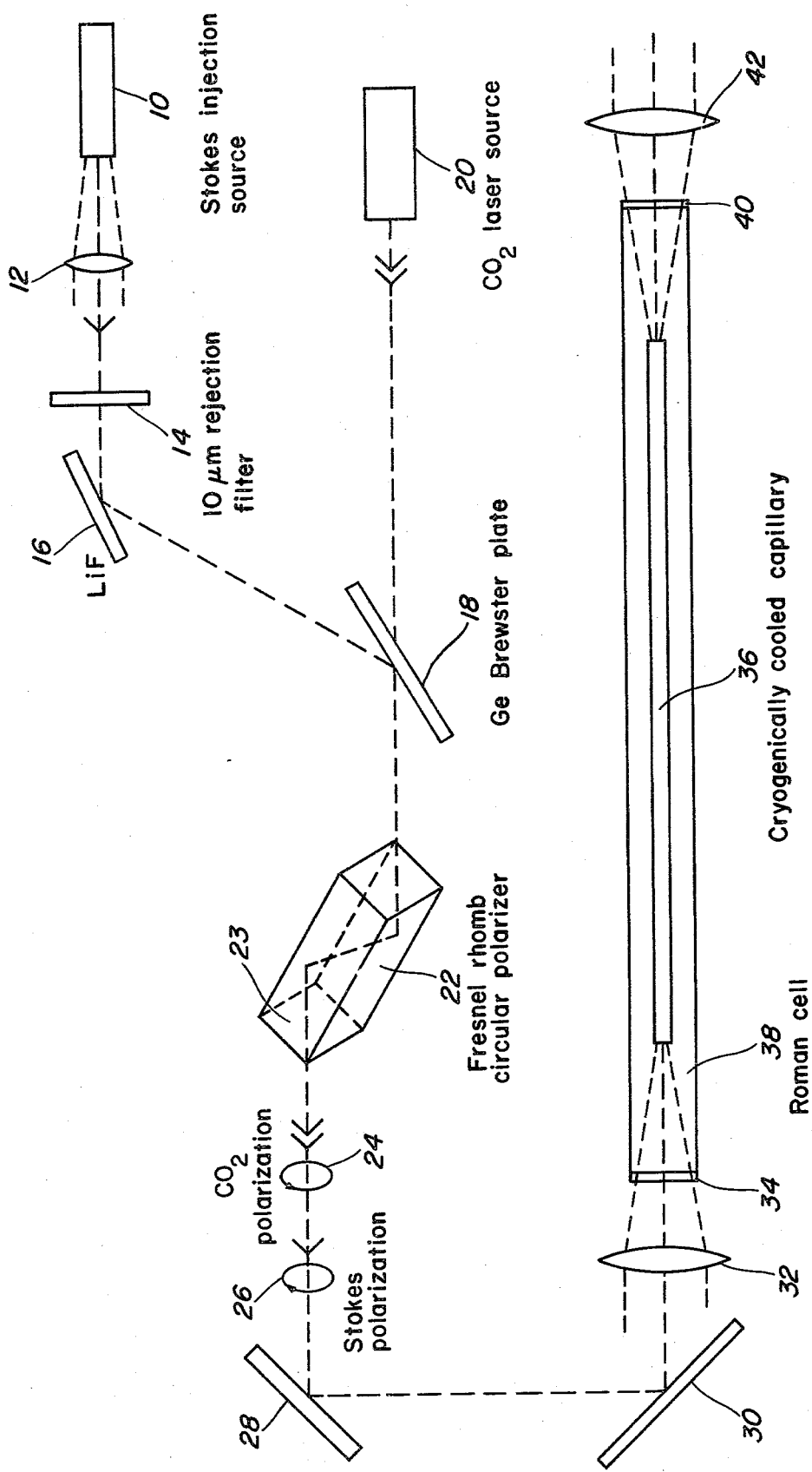
FIG. 1 is a schematic illustration of the Stokes injected Raman waveguide amplifier of the preferred embodiment of the invention.

FIG. 1 is a schematic illustration of a Stokes injected Raman waveguide amplifier. As outlined in the Background of the Invention, the approach of copending application Ser. No. 802,400, filed June 1, 1977 by Norman A. Kurnit was to use a dielectric waveguide to provide a long focal interaction length to overcome rapid divergence and low Raman gain at infrared wavelengths [proportional to Stokes frequency ($g \simeq 10^{-4} \text{cm}^{-1}/\text{MW/cm}^2$) for $S_{oo}(0)$ of para-$H_2$ at 77° at approximately 1 atmosphere of pressure using circularly polarized 10 $\mu$m radiation]. The cryogenically cooled capillary extends the focal interaction length sufficiently, as disclosed in the above referenced copending application, to generate spontaneous emission of the desired Stokes signal.

According to the present invention, an external Stokes injection source 10 is provided to reduce the required gain and the focal interaction length necessary to convert a large fraction of the $CO_2$ pump radiation to the Stokes frequency. As shown in FIG. 1, Stokes injection source 10 is collimated by lens 12 and directed to Ge Brewster plate 18 via 10 $\mu$m rejection filter 14 and LiF reflector 16. Ge Brewster plate 18 combines the Stokes injection signal and a $CO_2$ laser radiation signal from $CO_2$ laser source 20 into A Single coaxial path. The output of the $CO_2$ laser is spatially filtered and defined in direction by passing it through an evacuated waveguide (not shown) and recollimated before being passed through Ge Brewster plate 18. The Stokes radiation reflected from Ge Brewster plate 18 has a polarization orthogonal to the CO$_2$ laser radiation. When applied to KBr Fresnel rhomb circular polarizer 22, the CO$_2$ radiation and Stokes radiation are circularly polarized in opposite circular directions as shown at 24 and 26. The dispersion of KBr is sufficiently small that a rhomb designed to give quarter-wave retardation at 10 μm also gives nearly quarterwave retardation at 16 μm. Opposite circular polarization of these signals provides the largest Raman gain and, additionally, eliminates anti-Stokes coupling.

CO$_2$ radiation feedback to CO$_2$ laser source 20 is decoupled by Fresnel rhomb circular polarizer 22 which rotates the polarization of feedback radiation striking the Ge Brewster plate by 90°. CO$_2$ feedback radiation to Stokes injection source 10 is decoupled by 10 μm rejection filter 14, LiF restrahl reflection plate 16 and, if necessary, a gas absorption cell (not shown). The Fresnel rhomb circular polarizer 22 can be fabricated from KBr, KCl, CsI. NaCl, ZnSe, or other media transparent at the pump and Stokes wavelengths.

CO$_2$ laser source 20 can also be designed according to conventional methods to provide multiple frequency beam of preselected frequencies to enhance generation of a multiple frequency Stokes output signal. Several Stokes injection frequencies, corresponding to several preselected frequencies, may be necessary to provide sufficient gain on each of the Stokes output wavelengths. However, when sufficient gain is provided on a single Stokes frequency for which a sufficiently high intensity Stokes injection signal is provided, other Stokes output wavelengths are generated by a four-wave mixing process.

Stokes injection source 10 can comprise any one of a number of sources which provide the specified Stokes frequency which is determined as disclosed in the above referenced copending application Ser. No. 802,400 filed June 1, 1977 by Norman A. Kurnit, or any combination of plurality thereof for providing a multifrequency Stokes injection signal. Suitable Stokes injection sources include tunable diode lasers, optical parametric oscillators, electrical discharge lasers including bending mode lasers, various optically pumped lasers, nonlinear mixing including difference frequency generation or four-wave mixing as disclosed in above referenced copending application Ser. No. 787,415, or any other source of coherent radiation providing the desired frequency signal. Microwave frequency shifters can also be used, if necessary, to shift a fixed frequency laser to the desired Stokes frequency. Additionally, high pressure tunable CO$_2$ lasers can be used as element 20 to provide a tunable Stokes output frequency.

The oppositely circularly polarized Stokes radiation signal and CO$_2$ radiation signal are reflected from reflectors 28 and 30 and are focused by optics 32 on the cryogenically cooled capillary 36 disposed within Raman cell 38 containing the desired diatomic molecular gas, e.g., D$_2$, H$_2$, HD, HT, DT, or T$_2$ via window 34. The cryogenically cooled capillary 36 functions to extend the focal interaction length of the Stokes radiation and CO$_2$ radiation within the Raman gain medium. Depending on the length of the capillary 36, gains of $e^6$ to $e^{60}$ or greater can be achieved. The CO$_2$ signal and amplified Stokes signal are emitted from the Raman gain cell via output window 40 and collimated by optics 42 after a single pass through the capillary 36.

Figure 2:
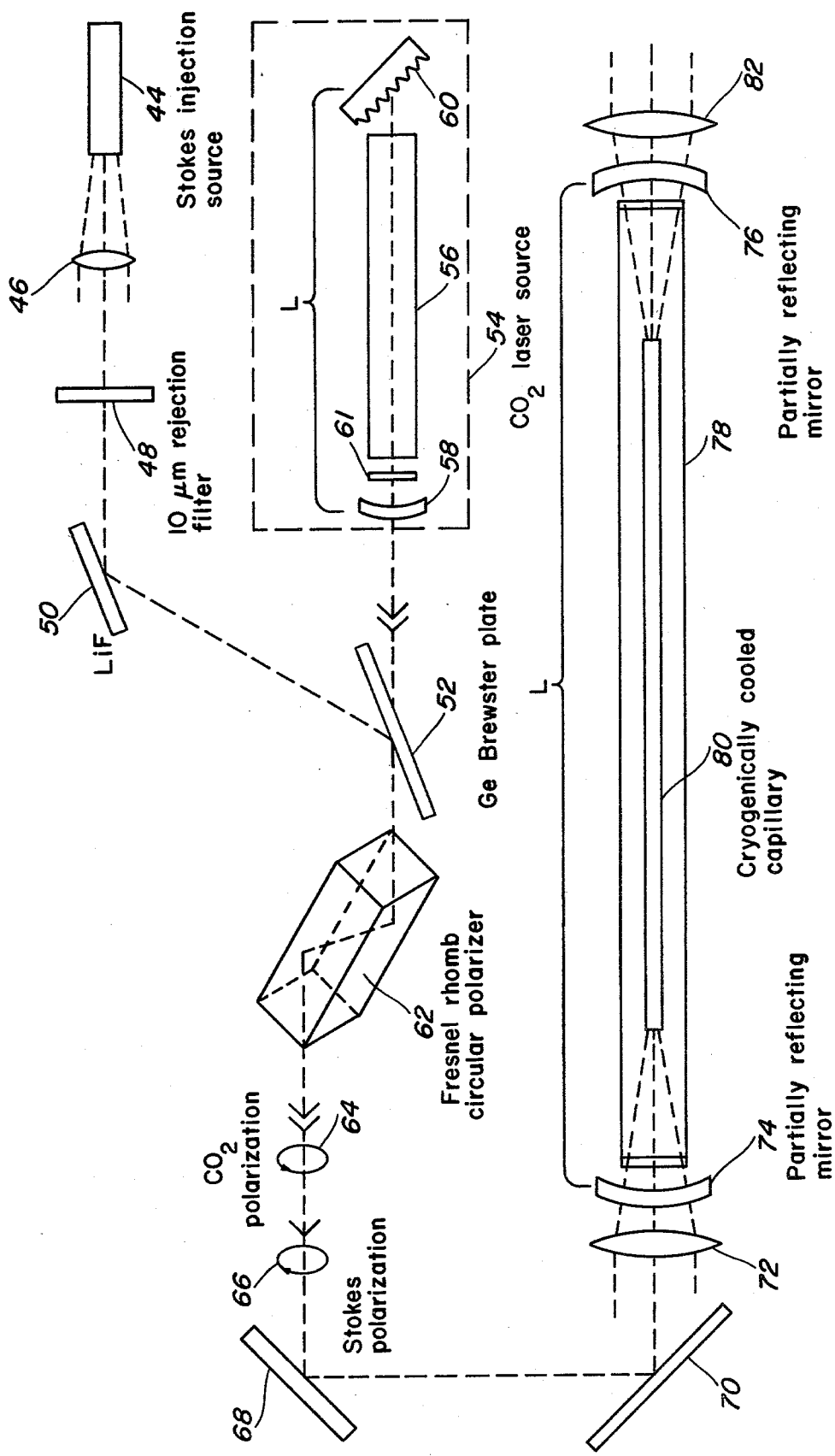
FIG. 2 is a schematic illustration of a Stokes injected Raman waveguide regenerative amplifier of the preferred embodiment of the invention.

FIG. 2 is a schematic illustration of a Stokes injected regenerative amplfier. The Stokes injection signal is generated by Stokes injection source 44 which is focused via lens 46 and passed through 10 μm rejection filter 48 and reflected by LiF reflector 50 and Brewster plate 52 in the same manner as shown in FIG. 1. The CO$_2$ laser source 54 comprises a typical tunable CO$_2$ laser having an output coupling mirror 58, a discharge cavity 56, a tunable grating 60, and, when desired, a mode locking element 61. Mode locking element 61 can comprise a saturable absorber such as a p-type germanium or an acousto-optic or electro-optic modulator. The CO$_2$ laser 54 is designed to have a total optical resonant cavity length equal to L. The combined signals are circularly polarized in Fresnel rhomb circular polarizer 62 and reflected from reflectors 68 and 70 and focused on the cryogenically cooled capillary 80 in the same manner as shown in FIG. 1. Partially reflecting mirrors 74 and 76 are placed around the Raman gain cell 78 to form an optical resonant cavity also having a length L identical to the length of the optical resonant cavity of the CO$_2$ laser 54.

With the CO$_2$ laser source 54 operating in a mode locked configuration, CO$_2$ pulses transmitted through the Raman gain cell 78 and cryogenically cooled capillary 80 are reflected from partially reflecting mirror 76 for a second pass through the capillary 80 without overlapping incoming CO$_2$ laser pulses within the focal region. Elimination of possible overlapping of input and reflected pulses in the cryogenically cooled capillary excludes the possibility of exceeding gas threshold breakdown levels, locally destroying the Raman gain effect. The optical resonant cavity of the CO$_2$ laser 54 is matched in length to the optical resonant cavity surrounding the Raman gain cell to ensure that the recirculating Stokes pulses coincide with synchronous gain pulses. Multiple passes of CO$_2$ mode locked pulses through the cryogenically cooled capillary 80 are accomplished by fabricating partially reflecting mirror 74 to be transmissive to 10 μm radiation, and partially reflecting mirror 76 to be reflective to 10 μm radiation. This allows a large portion of the CO$_2$ laser radiation energy to be applied to the Raman gain cell for at least two passes through the cryogenically cooled capillary 80. Similarly, partially reflecting mirrors 74 and 76 are fabricated to be partially reflecting to Stokes injection radiation to generate multiple passes of the Stokes injection radiation through the Raman gain cell. Although this reduces the magnitude of the Stokes radiation injected in the capillary waveguide regenerative amplifier, it significantly increases achievable gain of the output amplified Stokes signals since each of the multiple passes through the Raman waveguide regenerative amplifier provides high gain. The Raman gain signal is subsequently transmitted through partially reflecting mirror 76 and collimated by optics 82.

Figure 3:
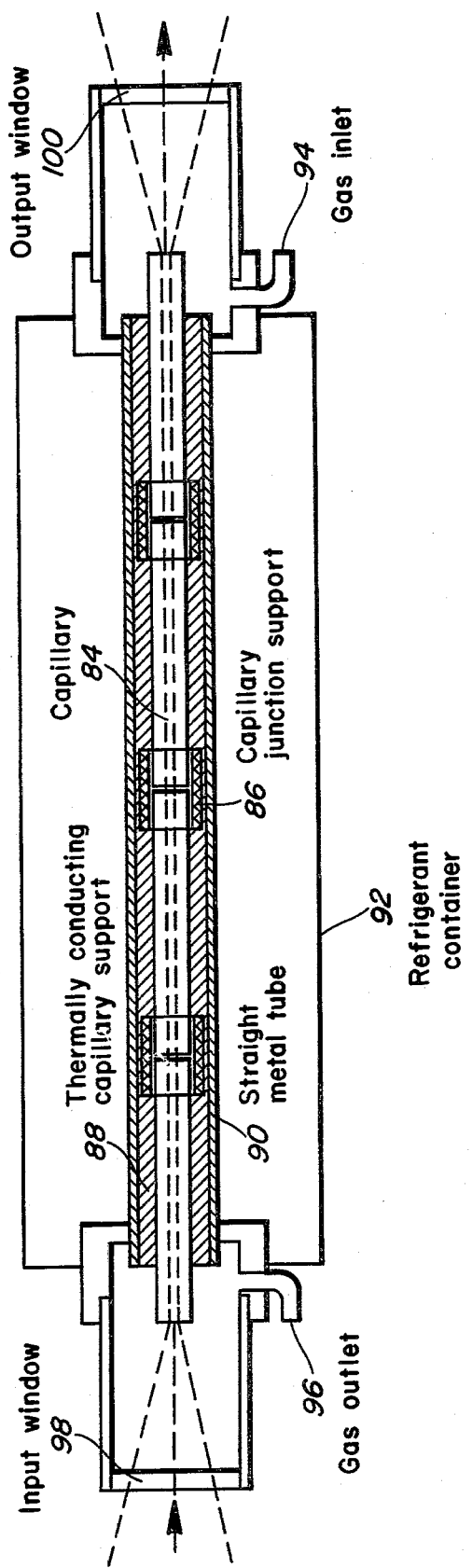
FIG. 3 is a schematic illustration of a plurality of optically aligned, cryogenically cooled capillaries.
Figure 4:
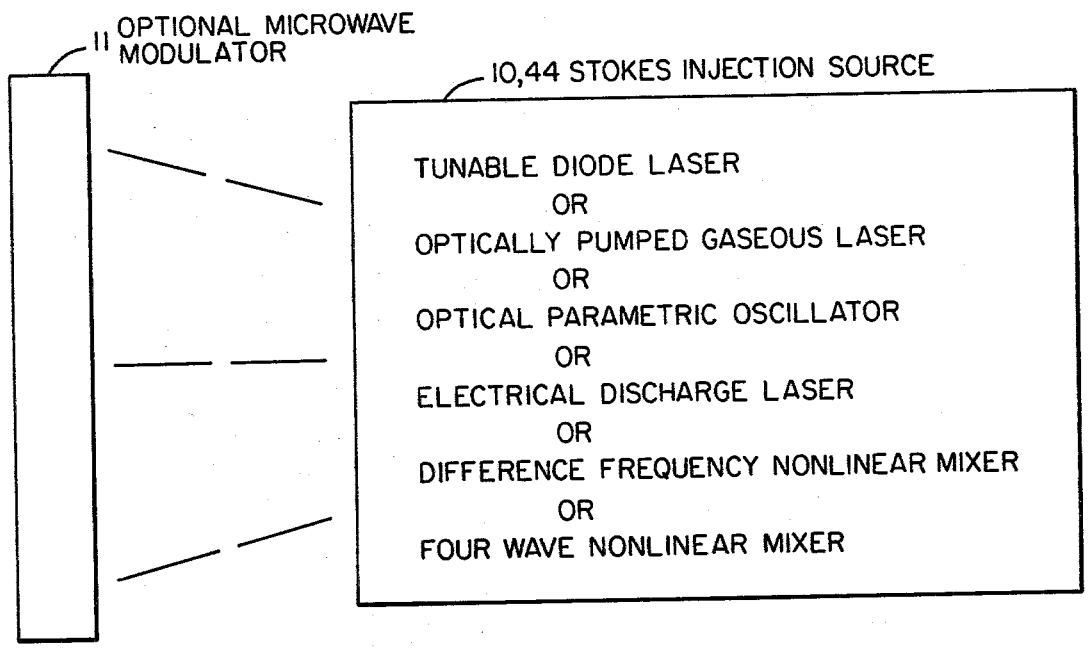
Figure 5:
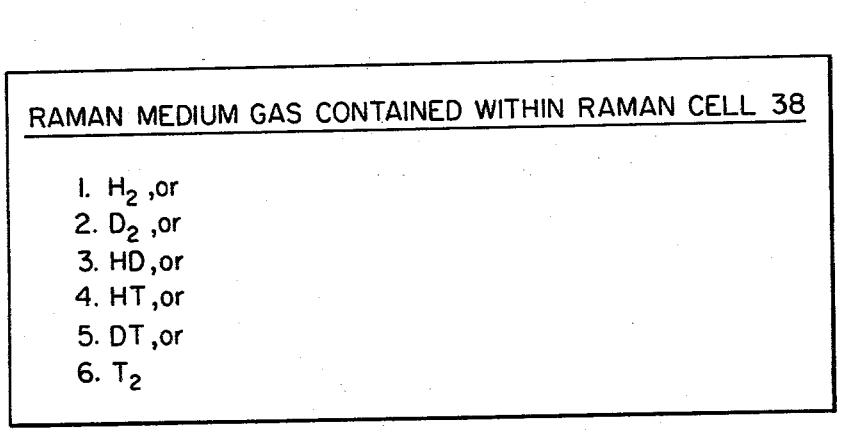
Figure 6:
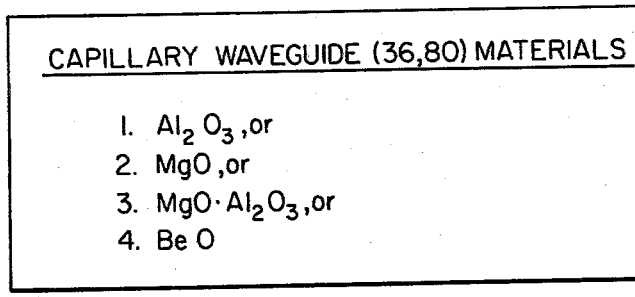

FIG. 3 is a detailed schematic diagram of a Raman waveguide capillary amplifier employing a plurality of capillary waveguides 84 joined together in a single axial path. The plurality of capillary waveguides 84 are joined together by capillary junction supports 86 and surrounded by thermally conducting capillary support 88 such as a copper braid or similar material. A straight metal tube 90 surrounds the thermally conducting capillary support 88 and provides stability and straightness to the combined structure. This combined structure is surrounded by a refrigerant container 92 which cryogenically cools the capillary structure to low temperatures. Liquid nitrogen is used as the cryogenic cooling medium which is placed within the refrigerant container 92. Gas inlet and outlet ports 94 and 96 provide a supply of Raman gain medium comprising a diatomic molecule such as $H_2$, $D_2$, HD, HT, DT, or $T_2$. Radiation signals are transmitted through the capillary waveguide via input and output windows 98 and 100.

A typical arrangement, such as shown in FIG. 3, employs three or four one meter waveguides connected in series having a 1.6 mm inner diameter. Using alumina (($Al_2O_2$), strong restrahl reflection from below 11 μm to beyond 18 μm provides a very low loss waveguide having approximately 90% throughput at 944 $cm^{-1}$ P(20) in a three meter long waveguide. Other materials such as MgO, BeO and a mixture of MgO and $Al_2O_3$ are suitable for fabricating capillary waveguides with high transmission characteristics in the infrared spectral region.

The present invention therefore provides a Stokes injected Raman waveguide amplifier and Stokes injected Raman waveguide regenerative amplifier capable of producing high gain Stokes output signals. This is accomplished according to the present invention utilizing a capillary waveguide amplifier or capillary waveguide regenerative amplifier which has high efficiency in converting $CO_2$ laser radiation energy to Stokes frequency radiation energy. The application of an external Stokes injection signal reduces required gain in the capillary waveguide amplifier or capillary waveguide regenerative amplifier to generate the amplified Stokes signal.

Obviously, many modications and variations of the present invention are possible in light of the above teachings. It is therefore to be understood that within the scope of the appended claims, the invention may be practiced otherwise than as specifically described.

What is claimed is:

1. A Stokes injected Raman waveguide amplifier comprising:
   capillary waveguide amplifier means for Raman scattering $CO_2$ laser radiation by rotational states of a diatomic molecule;
   means for injecting a separate and independent source of Stokes radiation in said capillary waveguide amplifier means to induce amplification of said Stokes radiation;
   whereby said Stokes radiation reduces required gain in said capillary waveguide amplifier to generate an amplified Stokes signal.

2. The amplifier of claim 1 wherein said source of Stokes radiation comprises a tunable diode laser.

3. The amplifier of claim 1 wherein said source of Stokes radiation comprises an optically pumped gaseous laser.

4. The amplifier of claim 1 wherein said source of Stokes radiation comprises an optical parametric oscillator.

5. The amplifier of claim 1 wherein said source of Stokes radiation comprises an electrical discharge gaseous laser.

6. The amplifier of claim 1 wherein said source of Stokes radiation comprises a difference frequency nonlinear mixer.

7. The amplifier of claim 1 wherein said source of Stokes radiation comprises a four-wave nonlinear mixer.

8. The amplifier of claim 3 wherein said optically pumped gaseous laser is frequency shifted by a microwave modulator.

9. The amplifier of claim 5 wherein said electrical discharge gaseous laser is frequency shifted by a microwave modulator.

10. The amplifier of claim 1 further comprising means for circularly polarizing said $CO_2$ laser radiation and said source of Stokes radiation in opposite circular directions.

11. The amplifier of claim 1 wherein said $CO_2$ laser radiation comprises a multifrequency signal such that said amplified Stokes signal comprises a multifrequency output signal.

12. A Stokes injected Raman waveguide amplifier comprising:
    a source of $CO_2$ laser radiation;
    a source of Stokes radiation;
    a capillary waveguide amplifier containing a Raman medium gas;
    means for injecting said source of $CO_2$ laser radiation and said source of Stokes radiation into said capillary waveguide amplifier to induce amplification of said Stokes radiation signal by Raman scattering of said $CO_2$ laser radiation by rotational states of said Raman medium gas.

13. The amplifier of claim 12 wherein said Raman medium gas comprises $D_2$.

14. The amplifier of claim 12 wherein said Raman medium gas comprises $H_2$.

15. The amplifier of claim 12 wherein said Raman medium gas comprises HD.

16. The amplifier of claim 12 wherein said Raman medium gas comprises HT.

17. The amplifier of claim 12 wherein said Raman medium gas comprises DT.

18. The amplifier of claim 12 wherein said Raman medium gas comprises $T_2$.

19. The amplifier of claim 12 wherein said capillary waveguide amplifier comprises a cooled $Al_2O_3$ capillary disposed within a Raman cell.

20. The amplifier of claim 12 wherein said capillary waveguide amplifier comprises a cryogenically cooled MgO capillary.

21. The amplifier of claim 12 wherein said capillary waveguide amplifier comprises a cryogenically cooled $MgO.Al_2O_3$ capillary.

22. The amplifier of claim 12 wherein said capillary waveguide amplifier comprises a cryogenically cooled BeO capillary.

23. The amplifier of claim 12 further comprising:
    means for combining said source of $CO_2$ laser radiation and said source of Stokes radiation in a single axial path;
    means for circularly polarizing said source of $CO_2$ laser radiation and said source of Stokes radiation in opposite circular directions.

24. The amplifier of claim 12 wherein said source of Stokes radiation comprises a diode laser.

25. The amplifier of claim 12 wherein said source of Stokes radiation comprises an optically pumped gaseous laser.

26. The amplifier of claim 12 wherein said source of Stokes radiation comprises an optical parametric oscillator.

27. The amplifier of claim 12 wherein said source of Stokes radiation comprises an electrical discharge gaseous laser.

28. The amplifier of claim 12 wherein said source of Stokes radiation comprises a difference frequency nonlinear mixer.

29. The amplifier of claim 12 wherein said source of Stokes radiation comprises a four-wave nonlinear mixer.

30. The amplifier of claim 25 wherein said optically pumped gaseous laser is frequency shifted by a microwave modulator.

31. The amplifier of claim 27 wherein said electrical discharge gaseous laser is frequency shifted by a microwave modulator.

32. The amplifier of claim 12 wherein said capillary waveguide amplifier comprises a plurality of optically aligned capillary waveguides.

33. The amplifier of claim 12 wherein said source of $CO_2$ laser radiation comprises a multifrequency source of $CO_2$ laser radiation.

34. The amplifier of claim 33 wherein said source of Stokes radiation comprises a multifrequency source of Stokes radiation.

35. A device for producing stimulated Raman scattering from rotational transitions in a diatomic molecular gas to amplify a Stokes signal comprising:
   a separate and independent external source of Stokes radiation;
   a source of $CO_2$ laser radiation;
   an interaction cell containing said diatomic molecular gas;
   capillary waveguide means disposed within said interaction cell for increasing focal interaction length of said source of Stokes radiation and said source of $CO_2$ laser radiation with said diatomic molecular gas to produce Raman scattering and amplify said Stokes radiation.

36. The device of claim 35 wherein said capillary waveguide means is constructed of $Al_2O_3$.

37. The device of claim 35 further comprising means for circularly polarizng said source of Stokes radiation and said source of $CO_2$ laser radiation in opposite circular directions.

38. The device of claim 35 further comprising an optical resonant cavity formed around said capillary waveguide means and said interaction cell.

39. The device of claim 35 wherein said diatomic molecular gas comprises $H_2$.

40. The device of claim 35 wherein said diatomic molecular gas comprises $D_2$.

41. The device of claim 35 wherein said diatomic molecular gas comprises HD.

42. The device of claim 35 wherein said diatomic molecular gas comprises HT.

43. The device of claim 35 wherein said diatomic molecular gas comprises DT.

44. The device of claim 35 wherein said diatomic molecular gas comprises $T_2$.

45. The device of claim 38 wherein said diatomic molecular gas comprises $H_2$.

46. The device of claim 38 wherein said diatomic molecular gas comprises $D_2$.

47. The device of claim 38 wherein said diatomic molecular gas comprises HD.

48. The device of claim 38 wherein said diatomic molecular gas comprises HT.

49. The device of claim 38 wherein said diatomic molecular gas comprises DT.

50. The device of claim 38 wherein said diatomic molecular gas comprises $T_2$.

51. The device of claim 35 wherein said source of Stokes radiation comprises an optically pumped gaseous laser.

52. The device of claim 35 wherein said source of Stokes radiation comprises an optical parametric oscillator.

53. The device of claim 35 wherein said source of Stokes radiation comprises a diode laser.

54. The device of claim 35 wherein said source of Stokes radiation comprises an electrical discharge gaseous laser.

55. The amplifier of claim 35 wherein said source of Stokes radiation comprises a difference frequency nonlinear mixer.

56. The amplifier of claim 35 wherein said source of Stokes radiation comprises a four-wave nonlinear mixer.

57. The amplifier of claim 51 wherein said optically pumped gaseous laser is frequency shifted by a microwave modulator.

58. The amplifier of claim 54 wherein said electrical discharge gaseous laser is frequency shifted by a microwave modulator.

59. The device of claim 38 wherein said source of Stokes radiation comprises an optically pumped gaseous laser.

60. The device of claim 38 wherein said source of Stokes radiation comprises an optical parametric oscillator.

61. The device of claim 38 wherein said source of Stokes radiation comprises a diode laser.

62. The device of claim 38 wherein said source of Stokes radiation comprises an electrical discharge gaseous laser.

63. The amplifier of claim 38 wherein said source of Stokes radiation comprises a difference frequency nonlinear mixer.

64. The amplifier of claim 38 wherein said source of Stokes radiation comprises a four-wave nonlinear mixer.

65. The amplifier of claim 59 wherein said optically pumped gaseous laser is frequency shifted by a microwave modulator.

66. The amplifier of claim 62 wherein said electrical discharge gaseous laser is frequency shifted by a microwave modulator.

67. The device of claim 38 wherein said source of $CO_2$ laser radiation has an optical resonant cavity of equal length to said optical resonant cavity formed around said capillary waveguide means.

68. The device of claim 35 wherein said capillary waveguide means comprises a plurality of optically aligned capillary waveguides.

69. The amplifier of claim 35 wherein said source of $CO_2$ laser radiation comprises a multifrequency source of $CO_2$ laser radiation.

70. The amplifier of claim 69 wherein said source of Stokes radiation comprises a multifrequency source of Stokes radiation.

71. A Stokes injected Raman waveguide regenerative amplifier comprising:
   capillary waveguide amplifier means for Raman scattering $CO_2$ laser radiation by rotational states of a diatomic molecule;
   means for injecting a separate and independent source of Stokes radiation in said capillary waveguide amplifier means to induce amplification to said Stokes radiation;
   an optical resonant cavity formed about said capillary waveguide amplifier;

whereby said Stokes radiation reduces required gain in said capillary waveguide amplifier to generate an amplified Stokes signal.

72. The regenerative amplifier of claim 71 wherein said source of Stokes radiation comprises a tunable diode laser.

73. The regenerative amplifier of claim 71 wherein said source of Stokes radiation comprises an optically pumped gaseous laser.

74. The regenerative amplifier of claim 71 further comprising means for circularly polarizing said $CO_2$ laser radiation and said source of Stokes radiation in opposite circular directions.

75. The amplifier of claim 71 wherein said $CO_2$ laser radiation comprises a multifrequency signal such that said amplified Stokes signal comprises a multifrequency output signal.

76. A Stokes injected Raman waveguide regenerative amplifier comprising:
a source of $CO_2$ laser radiation;
a separate and independent source of Stokes radiation;
a capillary waveguide amplifier containing a Raman medium gas;
means for injecting said source of $CO_2$ laser radiation and said source of Stokes radiation into said capillary waveguide amplifier to induce amplification of said Stokes radiation signal by Raman scattering of said $CO_2$ laser radiation by rotational states of said Raman medium gas;
an optical resonant cavity formed about said capillary waveguide amplifier.

77. The regenerative amplifier of claim 76 wherein said Raman medium gas comprises $D_2$.

78. The regenerative amplifier of claim 76 wherein said Raman medium gas comprises $H_2$.

79. The regenerative amplifier of claim 76 wherein said Raman medium gas comprises HD.

80. The regenerative amplifier of claim 76 wherein said Raman medium gas comprises HT.

81. The regenerative amplifier of claim 76 wherein said Raman medium gas comprises DT.

82. The regenerative amplifier of claim 76 wherein said Raman medium gas comprises $T_2$.

83. The regenerative amplifier of claim 76 wherein said capillary waveguide amplifier comprises a cryogenically cooled $Al_2O_3$ capillary disposed within a Raman cell.

84. The regenerative amplifier of claim 76 wherein said capillary waveguide amplifier comprises a cryogenically cooled MgO capillary.

85. The regenerative amplifier of claim 76 wherein said capillary waveguide amplifier comprises a cryogenically cooled $MgO.Al_2O_3$ capillary.

86. The regenerative amplifier of claim 76 wherein said capillary waveguide amplifier comprises a cryogenically cooled BeO.

87. The regenerative amplifier of claim 76 further comprising:
means for combining said source of $CO_2$ laser radiation and said source of Stokes radiation to a single axial path;
means for circularly polarizing said source of $CO_2$ laser radiation and said source of Stokes radiation in opposite circular directions.

88. The regenerative amplifier of claim 76 wherein said source of Stokes radiation comprises a diode laser.

89. The regenerative amplifier of claim 76 wherein said source of Stokes radiation comprises an optically pumped gaseous laser.

90. The regenerative amplifier of claim 76 wherein said source of Stokes radiation comprises an optical parametric oscillator.

91. The regenerative amplifier of claim 76 wherein said source of Stokes radiation comprises an electrical discharge gaseous laser.

92. The amplifier of claim 76 wherein said source of Stokes radiation comprises a difference frequency nonlinear mixer.

93. The amplifier of claim 76 wherein said source of Stokes radiation comprises a four-wave nonlinear mixer.

94. The amplifier of claim 89 wherein said optically pumped gaseous laser is frequency shifted by a microwave modulator.

95. The amplifier of claim 91 wherein said electrical discharge gaseous laser is frequency shifted by a microwave modulator.

96. The regenerative amplifier of claim 76 wherein said source of $CO_2$ laser radiation has an optical resonant cavity of equal length to said optical resonant cavity formed about said capillary waveguide amplifier.

97. The amplifier of claim 76 wherein said source of $CO_2$ laser radiation comprises a multifrequency source of $CO_2$ laser radiation.

98. The amplifier of claim 97 wherein said source of Stokes radiation comprises a multifrequency source of Stokes radiation.

99. A method of amplifying Stokes signals comprising:
generating a source of $CO_2$ laser radiation;
generating a separate and independent external source of Raman Stokes radiation;
applying said Raman Stokes radiation and said $CO_2$ laser radiation to a capillary waveguide amplifier containing a diatomic molecular gas to Raman scatter said $CO_2$ laser radiation and amplify said Raman Stokes radiation.

100. The method of claim 99 further comprising the step of circularly polarizing said Raman Stokes radiation and said $CO_2$ laser radiation in opposite circular directions.

101. The method of claim 99 further comprising the step of cryogenically cooling said capillary waveguide amplifier.

102. The method of claim 99 further comprising the step of forming an optical resonant cavity around said capillary waveguide amplifier to pass said Raman Stokes radiation through said capillary waveguide amplifier a plurality of times to regeneratively amplify said Raman Stokes radiation.

103. The method of claim 102 wherein said step of forming an optical resonant cavity comprises forming said optical resonant cavity to reflect said $CO_2$ laser radiation through said capillary waveguie amplifier.

104. The method of claim 99 wherein said step of generating a source of $CO_2$ laser radiation comprises mode locking pulses of said $CO_2$ laser radiation to synchronize pulses of said $CO_2$ laser radiation with the Stokes radiation pulses amplified in said optical resonant cavity.

105. The method of claim 99 wherein said step of generating a source of $CO_2$ laser radiation comprises generating a multifrequency source of $CO_2$ laser radiation.

106. The method of claim 105 wherein said step of generating an external source of Raman Stokes radiation comprises generating an external source of multifrequency Raman Stokes radiation.

107. A method of regeneratively amplifying Stokes signals comprising:
generating a source of mode locked $CO_2$ laser radiation pulses;
generating a separate and independent external source of Raman Stokes radiation;
applying said Raman Stokes radiation and said mode locked $CO_2$ laser radiation pulses to a capillary waveguide amplifier containing a diatomic molecular gas to Raman scatter said mode locked $CO_2$ laser radiation pulses and regeneratively amplify said Raman Stokes radiation to form Raman Stokes radiation pulses;
forming an optical resonant cavity around said capillary waveguide amplifier to reflect said Raman Stokes radiation pulses through said capillary waveguide amplifier synchronously with said mode locked $CO_2$ laser pulses.

* * * * *